US00RE37621E

(19) United States
(12) Reissued Patent
Henmi et al.

(10) Patent Number: US RE37,621 E
(45) Date of Reissued Patent: Apr. 2, 2002

(54) OPTICAL COMMUNICATION TRANSMISSION SYSTEM

(75) Inventors: Naoya Henmi; Shogo Nakaya; Tomoki Saito, all of Tokyo (JP)

(73) Assignee: NEC Corporation, Tokyo (JP)

(21) Appl. No.: 09/413,827

(22) Filed: Oct. 6, 1999

Related U.S. Patent Documents

Reissue of:
(64) Patent No.: 5,675,429
Issued: Oct. 7, 1997
Appl. No.: 08/452,728
Filed: May 30, 1995

U.S. Applications:

(63) Continuation of application No. 08/079,554, filed on Jun. 22, 1993, now abandoned.

(30) Foreign Application Priority Data

Jun. 22, 1992 (JP) ..... 4-162338
Sep. 7, 1992 (JP) ..... 4-237910

(51) Int. Cl.[7] ..... H04B 10/16; H04B 10/02
(52) U.S. Cl. ..... 359/179; 359/161; 359/173; 359/174; 385/123
(58) Field of Search ..... 359/123, 124, 359/161, 173, 174, 179, 181, 153, 333, 337, 341; 385/123, 27, 28

(56) References Cited

U.S. PATENT DOCUMENTS 5,140,452 A * 8/1992 Yamamoto et al. ..... 359/174
5,184,243 A * 2/1993 Henmi et al. ..... 359/181
5,191,631 A * 3/1993 Rosenberg ..... 385/123
5,218,662 A * 6/1993 Dugan ..... 385/123
5,224,183 A * 6/1993 Dugan ..... 359/124
5,257,126 A * 10/1993 Calvani et al. ..... 359/181
5,261,016 A * 11/1993 Poole ..... 385/28
5,361,319 A * 11/1994 Antos et al. ..... 385/123

FOREIGN PATENT DOCUMENTS

JP 62-65529 * 3/1987
JP 62-65530 * 3/1987

OTHER PUBLICATIONS

T. Suzaki et al., "10–Gbit/s Optical Transmitter Model with Multiquantum Well DFB LD and Doped–Chennel Heret-o–MISFET Driver IC", Technical Digest TUI2, OFC '90, p. 38.*

T. Suzaki et al., "Ten–Gbit/s Optical Transmitter Module Using Modulator Driver IC and Semiconductor modulator", Technical Digest TUI6, OFC '92, pp. 52–53.*

N. Bergano et al., "9000 km, 5 Gb/s NRZ Transmission . . . Amplifiers", Postdeadline Papers PD11, Tech, Dig. of Topical Meeting on Optical Amplifiers and Their Applications, Jun. 24–26, 1992, pp. 48–51.*

(List continued on next page.)

*Primary Examiner*—Bhavesh Mehta
(74) *Attorney, Agent, or Firm*—Sughrue, Mion, Zinn, Macpeak & Seas, PLLC

(57) ABSTRACT

An optical communication transmission system including an optical amplifier lumped repeater system of the present invention includes, for the purpose of preventing degradation of the transmission characteristic arising from wavelength dispersion of optical fibers due to raised power of the optical signal, transmission optical fibers provided for all or most of the repeating sections and having wavelength dispersion values set to different values from zero, and optical fibers provided for the individual sections to compensate for the sum of wavelength dispersion of the sections so as to reduce the total wavelength dispersion to zero. The optical fiber for compensation for each section may be replaced by a substitutive compensation element. Alternatively, very small wavelength dispersion which remains due to failure in compensating to zero dispersion may be compensated for using a dispersion equalizer of an electric system in the reception section.

29 Claims, 7 Drawing Sheets

OTHER PUBLICATIONS

T. Imai et al., "over 10,000 km Straight Line . . . Optical Amplifiers", Postdeadline Papers PD12, tech. Dig. of Topical Mtg on Optical Amplifiers and Their Applications, Jun. 24–26, 1992, pp. 52–56.*

A. Gnauck et al., "optical Equalization of Fiber Chromatic . . . in a 5 Gbit/s Transmission System", Postdeadline Paper PD7, OFC '90, Jan. 22–26, 1990, pp. PD7–1—PD7–4.*

N. Henmi et al, "A Novel Dispersion Compensation Technique . . . Optical Fiber at 1.5nm Wavelength", Postdeadline Paper PD8, OFC '90, Jan. 22–26, 1990, pp. PD8–1—PD8–4.*

K. Iwashita, "Chromatic Dispersion Compensation in Coherent Optical Communications", Journal of Lightwave Technology, vol. 8, No. 3, Mar. 1990, pp. 367–375.*

S. Saito, "2.5 Gbit/s, 80–100 km Spaced . . . Experiments Over 2,500–4,500 km", Postdeadline Paper 3, Tech. Dig. of 17th European Conference on Optical Communication ECOC '91, Sep. 1991, pp. 68–71.*

"Single–Channel Operation in Very Long Nonlinear Fibers With Optical Amplifiers at Zero Dispersion", Journal of Lightwave Technology, vol. 9, No. 3, Mar. 1991, 1990.*

IEEE Photonics Technology Letters, vol. 4, No. 3, Mar. 1992, pp. 278–280, N. Takachio et al., "Optical PSK Synchronous Heterodyne Detection Transmission experiment Using Fiber Chromatic Dispersion Equalization".

Electronics Letters, vol. 25, No. 15, Jul. 20, 1989, pp. 999–1000, H. Taga et al., "4 Gbits/s, 188 km Optical Fibre Transmission Experiment using three Packaged Laser Amplifiers".

Optics Letters, vol. 5, No. 11, Nov. 1980, pp. 476–478, C. Lin et al., "Optical–pulse equalization of low–dispersion transmission in single–mode fibers in the 1.3–1.7 $\mu$m spectral region".

H. Taga, et al., "'4 Gbit/s. 188 km Optical Fibre Transmission Experiment Using Three Packaged Laser Amplifiers", *Electronics Letters,* vol. 25, No. 15 (Jul. 20, 1993).*

* cited by examiner

OPTICAL COMMUNICATION TRANSMISSION SYSTEM

Matter enclosed in heavy brackets [ ] appears in the original patent but forms no part of this reissue specification; matter printed in italics indicates the additions made by reissue.

This is a Continuation of application Ser. No. 08/079,554 filed Jun. 22, 1993 now abandoned.

BACKGROUND OF THE INVENTION

1. Field of the Invention

This invention relates to a high-speed, long-haul communication transmission circuit by an optical fiber, and more particularly to an optical communication transmission system which is expected to be developed as a communication system for a transmission network for advanced information service and which can transmit a large amount of information with a high degree of quality over a long distance.

2. Description of the Related Art

An optical communication transmission system makes use of the broad band feasibility of light to permit high-speed, very high-capacity, high-quality communications which cannot be realized readily with conventional communications using the microwave band or the millimeter wave band. For example, the following reports have been provided with regard to elements for use with communication of, for example, 10 Gbit/s:

by T. Suzaki et al., "10-Gbit/s Optical Transmitter Model with Multiquantum Well DFB LD and Doped-channel Hetero-MISFET Driver IC," 1990 Optical Fiber Communication Conference, Technical Digest TUI2, and by T. Suzaki et al., "Ten-Gbit/s Optical Transmitter Module Using Modulator Driver IC and Semiconductor Modulator," Optical Fiber Communication Conference 1992, Technical digest TUI6.

An optical communication transmission system of the optical amplifier lumped repeater system which uses erbium-doped optical fiber amplifiers will be described with reference to FIG. 1.

An optical transmitter 3 modulates optical power outputted from a semiconductor laser source 1 by intensity modulation by an external modulator 2 of lithium niobate LiNbO3 which is driven by a signal of 10 Gbit/s outputted from a modulation signal source 5 and outputs the modulated optical power to an optical power amplifier 11. The optical power amplifier 11 consists of an erbium-doped optical fiber amplifier and amplifies a signal light level and outputs the amplified optical signal to a first optical fiber 101 for a transmission line of an optical amplifier lumped repeater system. In this instance, when the signal light level exceeds 10 dBm, in order to avoid the influence of Brillouin scattering in the transmission fiber, the line width of the semiconductor laser is expanded in advance using the well-known technique of direct FM modulation of the semiconductor laser or a like technique. After passing the optical fiber 101, the optical signal is amplified again by a direct optical amplifier repeater 12 which consists of an erbium-doped optical fiber amplifier and is then outputted to a second stage optical fiber 111 for transmission. The signal light inputted into the transmission line at the second stage is amplified by a second stage optical amplifier repeater 13 and outputted to a third transmission line 121. The signal light is thereafter processed in a similar manner and transmitted finally to a last transmission line 191. In an optical receiver 53 on the reception side, the optical signal is amplified by an optical preamplifier 21 and converted into an electric signal using a PIN photodiode 51, which is a photoelectric transducer. The electric signal, and consequently, the signal of 10 Gbit/s transmitted from the modulation signal source 5, is then reproduced by an equalizer amplifier regeneration circuit 52.

In the high-speed, high-capacity communication system described above, however, it is known that waveform distortion after transmission due to such causes as chromatic dispersion of the optical fibers strongly degrades the transmission characteristic through a very long distance transmission.

Therefore, the following countermeasures are conventionally taken:

First, as a countermeasure to chromatic dispersion of an optical fiber, which is conventionally considered to be the most significant cause of degradation of the transmission characteristic, a transmission line is constructed using an optical fiber which has no chromatic dispersion in the waveband of the light source of the optical transmitter. In other words, the optical fiber employed has zero chromatic dispersion.

For example, as a communication system for a long-distance submarine cable, transmission systems wherein the dispersion value of an optical fiber for transmission is reduced substantially to zero have been proposed by:

N. S. Bergano et al., "9000 km, 5 Gbit/s NRZ Transmission Experiment Using 274 Erbium-doped Fiber-Amplifiers," Technical Digest of Topical Meeting on Optical Amplifiers and Their Applications, Santa Fe, Jun. 24–26, 1992, postdeadline paper PD11, and T. Imai et al., "Over 10,000 km Straight Line Transmission System Experiment at 2.5 Gbit/s Using In-Line Optical Amplifiers," Technical Digest of Topical Meeting on Optical Amplifiers and their Applications, Santa Fe, Jun. 24–26, 1992, postdeadline paper, PDI2.

In an actual transmission line, however, the requirement for zero chromatic dispersion cannot be fully satisfied over the entire length of the optical fiber, and very small level of chromatic dispersion exists. In order to suppress the influence of the very small dispersion, several techniques for compensating for the chromatic dispersion in the transmitter side and the receiver side have been proposed, for example, in Japanese Patent Laid-open No. 1987-65529 and Japanese Patent Laid-open No. 1987-65530, and by:

A. H. Gnauck et al., "Optical Equalization of Fiber Chromatic Dispersion in a 5 Gbit/s Transmission System," Optical Communication Conference, San Francisco, Jan. 22–26, 1990, postdeadline paper PD7, and N. Henmi et al., "A Novel Dispersion Compensation Technique for Multigiga-bit Transmission with Normal Optical Fiber at 1.5 Micron Wavelength," Optical Fiber Communication Conference 1990, postdeadline paper PD8.

Further, in a coherent communication system, such techniques as equalizing an electric signal in the receiver side by using a delay equalizer at the stage of an intermediate frequency of the electric signal have been reported by:

K. Iwashita et al., "Chromatic Dispersion Compensation in Coherent Optical Communications", IEEE, Journal of Lightwave Technology, Vol. 8, NO. 3, March 1990, pp. 367–375.

It is known that the causes for degradation of the transmission characteristic of an optical amplifier lumped repeater system include, in addition to wavelength dispersion of the optical fiber described above, a noise accumulation effect caused by spontaneous emission light and a noise increase effect caused by a non-linear effect in the optical fiber through multistage optical amplifier repeaters. In order to decrease the influence of the accumulation effect of noise of spontaneous emission light, the outputs of the optical amplifier repeaters must be set high. On the other hand, in order to suppress the non-linear effect in the optical fiber, the outputs of the optical amplifier repeaters must necessarily be set low. Due to these two contradictory requirements, it is conventionally difficult to simultaneously control both the noise accumulation effect and the non-linear effect. Therefore, in order to obtain a very long-haul transmission system or achieve an increase of the repeating distance, it is necessary to increase the repeater output while decreasing the non-linear effect in the optical fiber.

However, little is known of the non-linear effect in an optical fiber, and the causes of degradation have not been specifically identified as yet.

SUMMARY OF THE INVENTION

It is believed that a self-phase modulation effect is a major factor in the non-linear effect in an optical fiber. However, as recently reported by S. Saito et al. ["2.5 Gbit/s, 80–100 km Spaced In-line Amplifier Transmission Experiments Over 2,500–4,500 km," Technical Digest of European Conference on Optical Communication 1991, postdeadline paper 3], in addition to the self-phase modulation effect, noise is increased by the influence of a 4 wave-mixing effect between signal light and spontaneous emission light outputted from the optical amplifier, resulting in the degradation of the transmission characteristic.

Further, in addition to the self phase modulation effect, a noise increase believed to arise from a non-linear effect in an optical fiber for each section of a multistage optical amplifier lumped repeater system was discovered in experiments conducted by the inventors of the present application which will be hereinafter described.

It has been made clear that those noise-increasing effects, other than the self-phase modulation effect, increase with the increase of the signal power and the increase of the transmission distance, and noise is produced over the full length of the transmission line, resulting in a greater spectrum spread and a greater degradation of the signal-to-noise ratio than the self-phase modulation effect. Accordingly, it has become clear that the transmission limit is restricted by the non-linear effect in the optical fiber.

It has become apparent through experiments that the non-liner effect in the optical fiber occurs when the transmission light power is high but is deterred when the optical fiber for transmission does not have a zero dispersion wavelength at the wavelength of the optical signal. Therefore, if an optical fiber which does not have a zero dispersion wavelength at the wavelength of the optical signal is employed as the optical fiber for transmission, the non-linear effect in the optical fiber can be suppressed even when the transmission light power is high.

It is an object of the present invention to provide an optical communication transmission system including an optical amplifier lumped repeater system wherein very high-speed, high-capacity and long-haul optical communications can be realized with a high degree of quality.

In order to attain the object described above, an optical communication transmission system of the present invention includes transmission optical fiber means having a zero dispersion wavelength of a value different from the transmission wavelength of the optical transmitter means with at least two connections between the optical transmitter means and the optical receiver means, and dispersion compensation means for making the sum total of wavelength dispersion substantially equal to zero when the sections are arranged in cascade connection.

In an embodiment of the present invention, the dispersion compensation means is included in each of the sections of the transmission optical fiber means or in the optical transmitter means or the optical receiver means. Further, an optical signal is modulated by the optical transmitter means and received in a coherent system by the optical receiver means, and the influence of wavelength dispersion upon the optical signal over the entire transmission line is compensated by the electric dispersion equalization means. The type of modulation by the optical transmission may be optical frequency modulation, phase modulation or polarization modulation.

Further, the present invention can be applied readily to a conventional system by installing a dispersion compensation optical fiber for a transmission optical fiber, which is conventionally provided on the outside, inside an optical repeater and replacing the optical repeater. Alternatively, it is possible to install a small dispersion compensator such as a grating pair in the apparatus in place of the dispersion compensation optical fiber.

In summary, according to the present invention, in order to suppress the non-linear effect in an optical fiber, the zero dispersion wavelength of the transmission optical fibers, which is conventionally made to coincide with the transmission wavelength, is shifted from the transmission wavelength for each section. By virtue of this means, the present invention has the advantage that the transmission optical power of an optical amplifier lumped repeater system can be increased so as to improve the transmission characteristic, and consequently, a very high-speed, very long-haul optical communication transmission system can be realized readily.

The above and other objects, features, and advantages of the present invention will become apparent from the following description referring to the accompanying drawings which illustrate the examples of the preferred embodiments of the present invention.

DETAILED DESCRIPTION OF THE PREFERRED EMBODIMENTS

The results of experiments with the conventional optical communication transmission system shown in FIG. 1 will first be described for comparison with the present invention.

Figure 1:
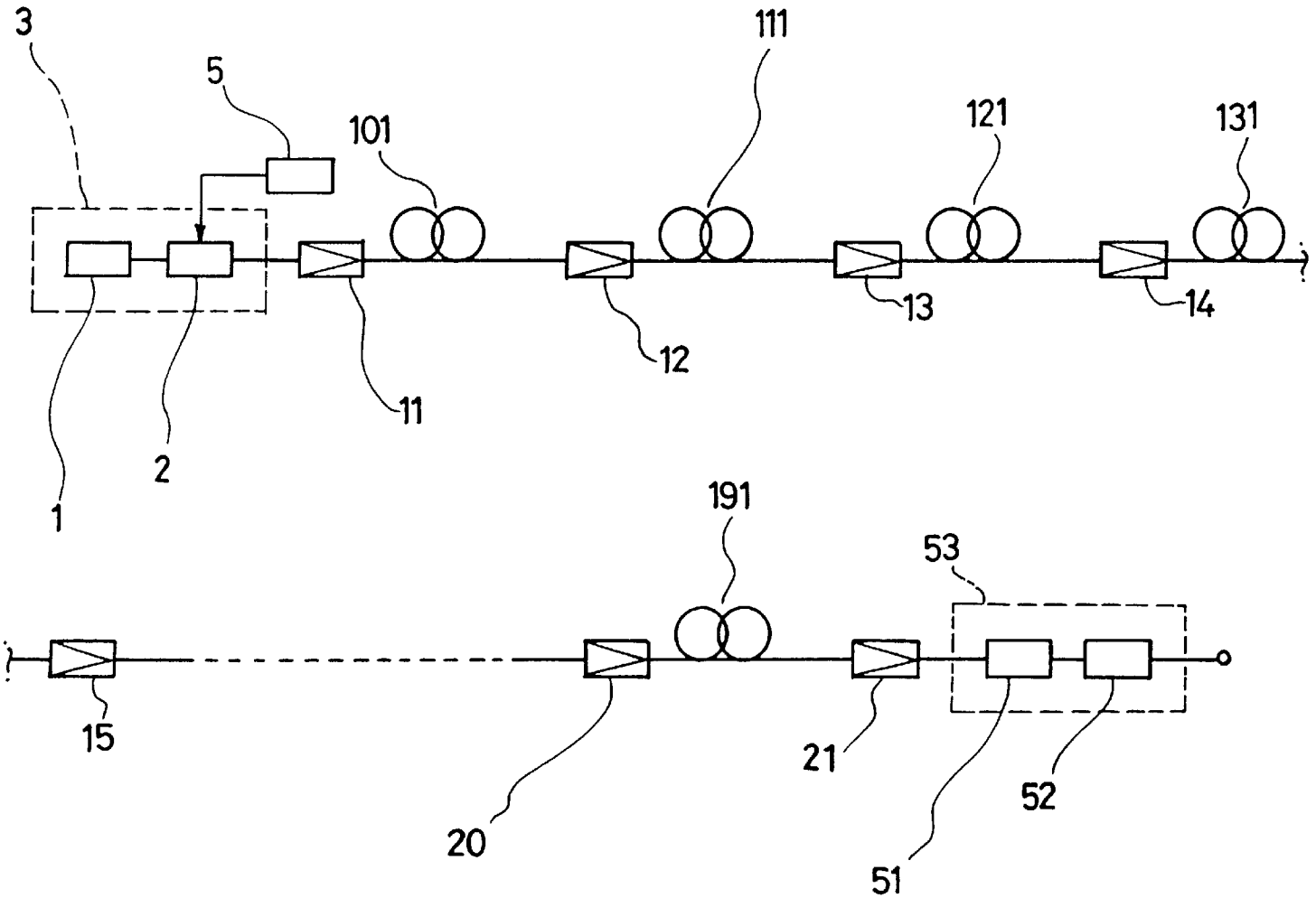
FIG. 1 (PRIOR ART)
FIG. 1 is a diagrammatic view of a conventional optical amplifier lumped repeater system.
Figure 2:
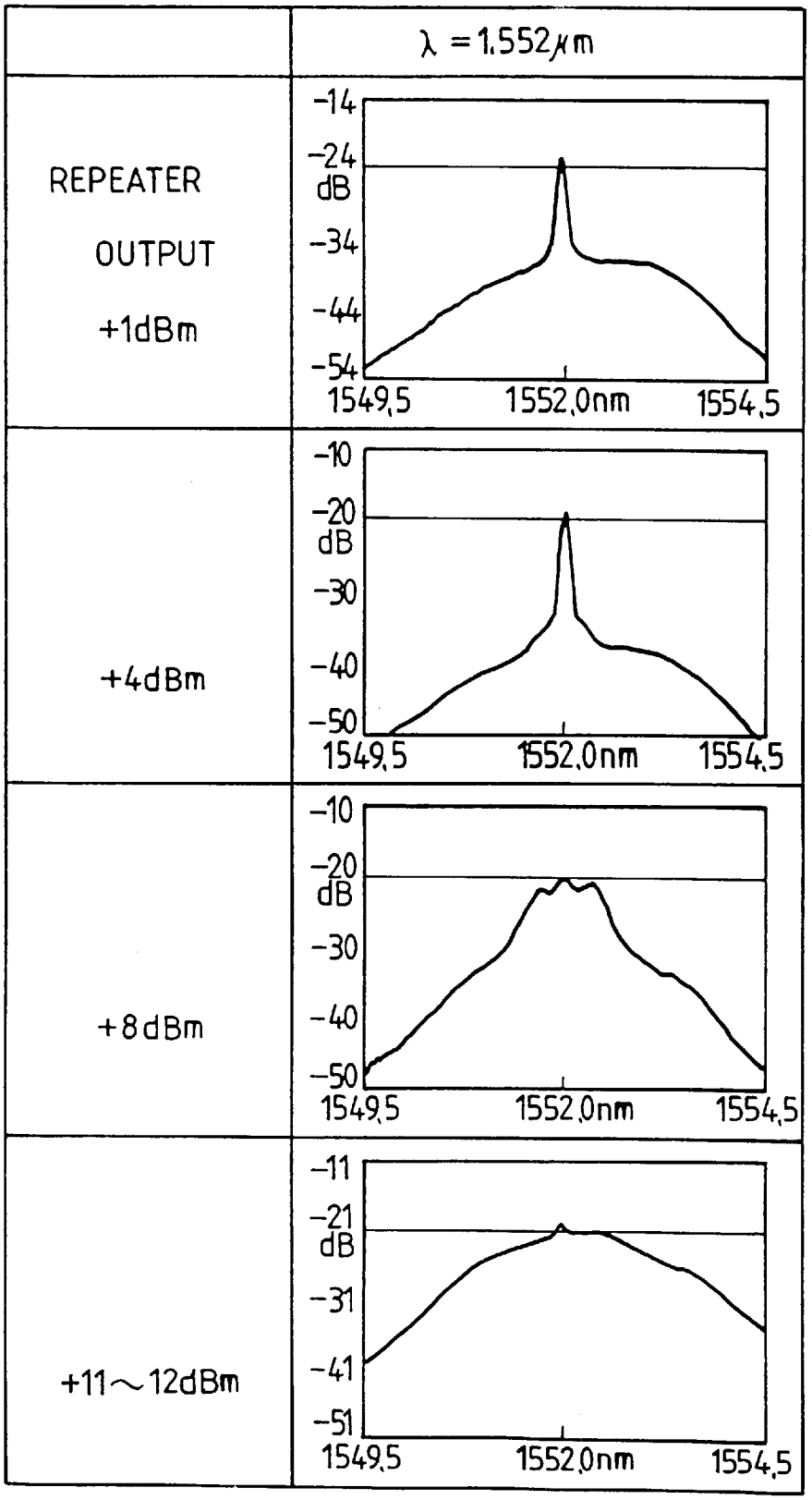
FIG. 2 is a spectrum diagram of the received signal when, in the repeater system of FIG. 1, the wavelength of the semiconductor laser source is set to the conventional standard of 1.552 $\mu$m and the power of the transmitter optical signal is raised.

In the transmission system of FIG. 1, the wavelength of the semiconductor laser source was set to 1.552 $\mu$m and a 1,000-km transmission experiment using a stage optical amplifier repeater was conducted using, for the optical fibers 101, 111, 121, 131, . . . and 191, a dispersion shifted fiber of 100 km whose zero dispersion wavelength was 1.552 $\mu$m. Here, the transmission loss of the dispersion shifted fiber per 100 km was 22 to 23 dB, and the noise figures of the optical power amplifier 11, the optical amplifier repeaters 12, 13, 14, 15, . . . and 20 and the optical preamplifier 21 were 8 to 9 dB. When the output levels of the optical power amplifier 11 and the optical amplifier repeaters 12 to 20 were set to approximately 1 dBm, the power levels of the input signal light power into the optical amplifiers dropped to −21 to −22 dBm, and consequently, the reception failed due to noise increase by noise accumulation of the spontaneous emission line. Thus, the optical amplifier repeater output power level was increased, but a good transmission characteristic was not obtained even when the signal level was raised to +11 to +12 dBm. FIG. 2 shows the reception signal spectra. It can be seen that when the transmission signal light level is raised, the signal-to-noise ratio of the signal light level is degraded conversely due to a non-linear effect in the optical fiber.

Figure 3:
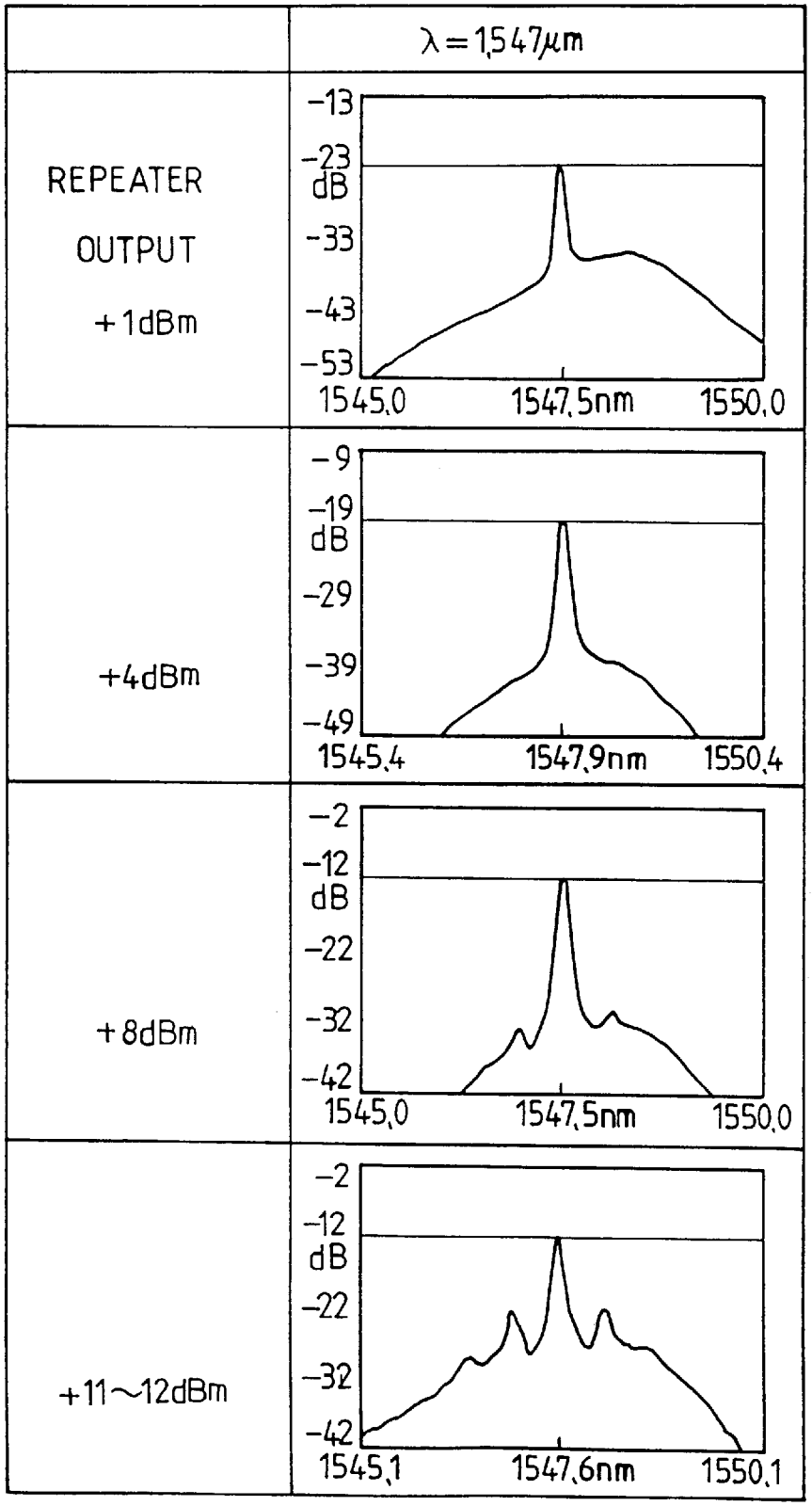
FIG. 3 is a spectrum diagram of the received signal when the wavelength of the semiconductor laser source is set to 1.547 $\mu$m and the power of the transmission optical signal is raised.
Figure 4:
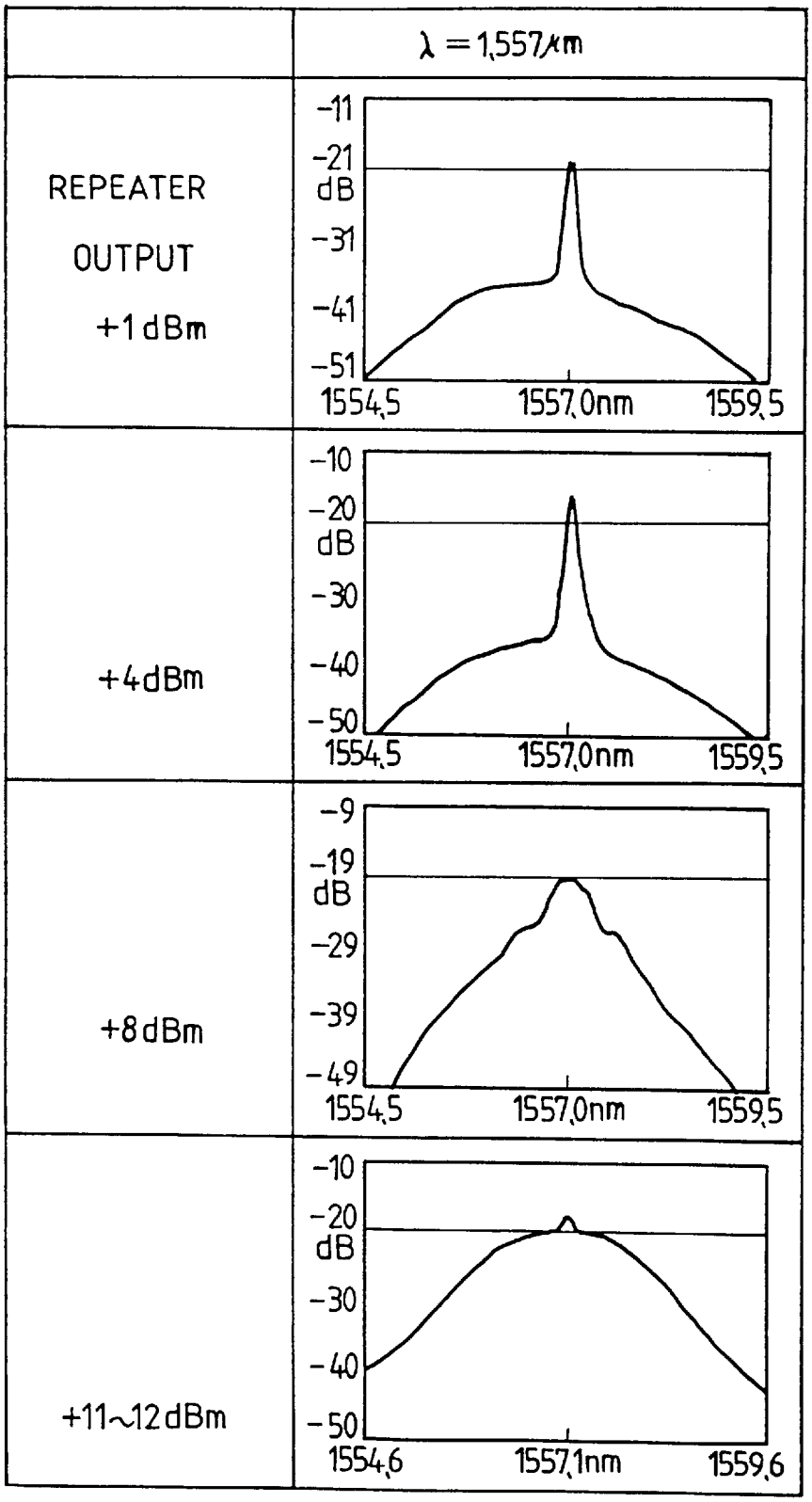
FIG. 4 is a spectrum diagram of the received signal when the wavelength of the semiconductor laser source is set to 1.557 $\mu$m and the power of the transmission optical signal is raised.

As a preliminary experiment of the present invention, the same experiment was conducted with the same transmission system as that of FIG. 1 changing the 1.552 $\mu$m wavelength of the semiconductor laser source to 1.547 $\mu$m and 1.557 $\mu$m. Here, the dispersion shifted fibers 101, 111, 121, . . . and 191 had the dispersion values of D=−0.35 ps/km/nm and D=+0.35 ps/km/nm, respectively, for the two wavelengths. Observation of the reception spectra after transmission line revealed that, as can be seen in FIGS. 3 and 4, the signal-to-noise ratio after transmission is improved at each of the anomalous (D>0) and normal (D<0) dispersion values. However, since the amount of dispersion of the entire transmission line was great, the waveform distortion after transmission was too great to receive the signal.

Conventionally, it is believed that the transmission characteristic degradation by a non-linear effect in an optical fiber arises from waveform distortion by self-phase modulation, but according to the experiments, a noise-increasing effect due to the non-linearity in the optical fiber has been observed.

While the cause of the noise-increasing effect is unknown, the inventors have clearly shown, based on the experiments, that the noise increase is great when the signal light has the same wavelength as the zero dispersion wavelength in the optical fiber but is small when the signal light does not have the same wavelength as the zero dispersion wavelength in the optical fiber. Also it has been observed that as the transmission distance increases, the noise component also increases, and it has been found out that the noise is produced over the entire length of the optical fibers constituting the transmission line and suppression of the noise increase is significant in the normal (D<0) dispersion region.

Figure 5:
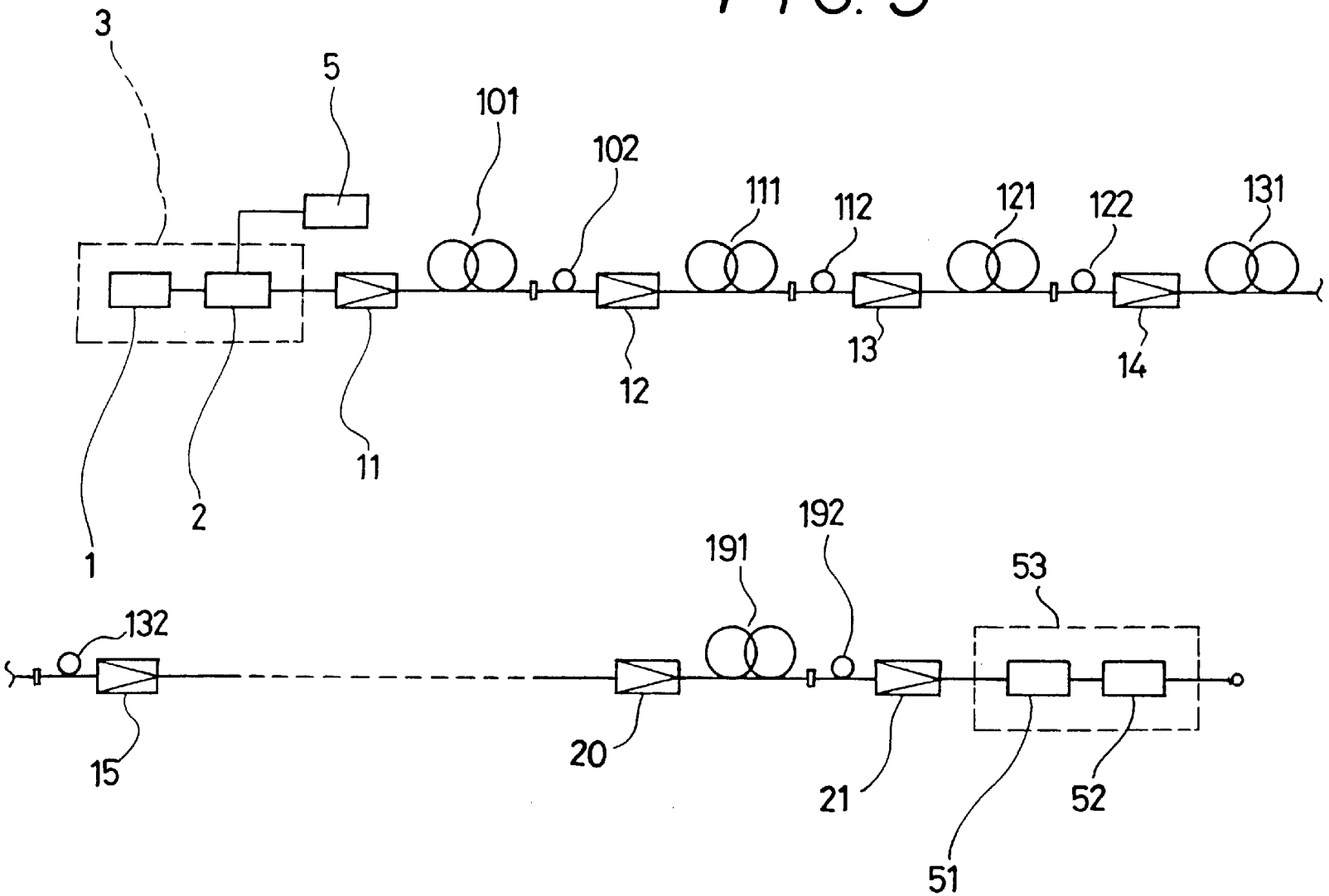
FIG. 5 is a diagrammatic view of an optical amplifier lumped repeater system of a first embodiment of the present invention.

The first embodiment of the present invention will next be described with reference to FIG. 5.

The wavelength of a semiconductor laser source 1 is set to 1.547 $\mu$m, and optical fibers 101, 111, 121, 131, . . . and 191 of a transmission line are constituted from dispersion shifted fibers whose zero dispersion wavelength is 1.552 $\mu$m. Conventional fibers 102, 112, 122, 132, . . . and 192 which have anomalous dispersion (D>0) are inserted after the dispersion shifted fibers 101 to 191 of the individual transmission sections for compensating for the wavelength dispersion of the respective fibers 101 to 191. Since the amount of dispersion of the dispersion shifted fiber for each section is −35 ps/nm per 100 km, the conventional (D>0) fibers of about 2 km (dispersion value 35 ps/nm) were arranged in cascade connection to set the total amount dispersion of each section to a value in the proximity of 0 ps/nm. As a result, when the repeater output was higher than +8 dBm, a good transmission characteristic was obtained wherein the reception sensitivity degradation after transmission was approximately 1 dB.

Further, as a second embodiment, in place of the conventional (D>0) fiber of the first embodiment, dispersion compensators of [−35] +35 ps/nm were constituted from grating pairs, and the dispersion compensators were built into the optical repeaters, following which a transmission experiment similar to the first embodiment was conducted. In this experiment, a good result of approximately 1 dB was obtained for the amount of deterioration of reception sensitivity after transmission. In the present embodiment, optical fibers for dispersion compensation may be mounted in the optical repeaters in place of the dispersion compensators.

Figure 6A:
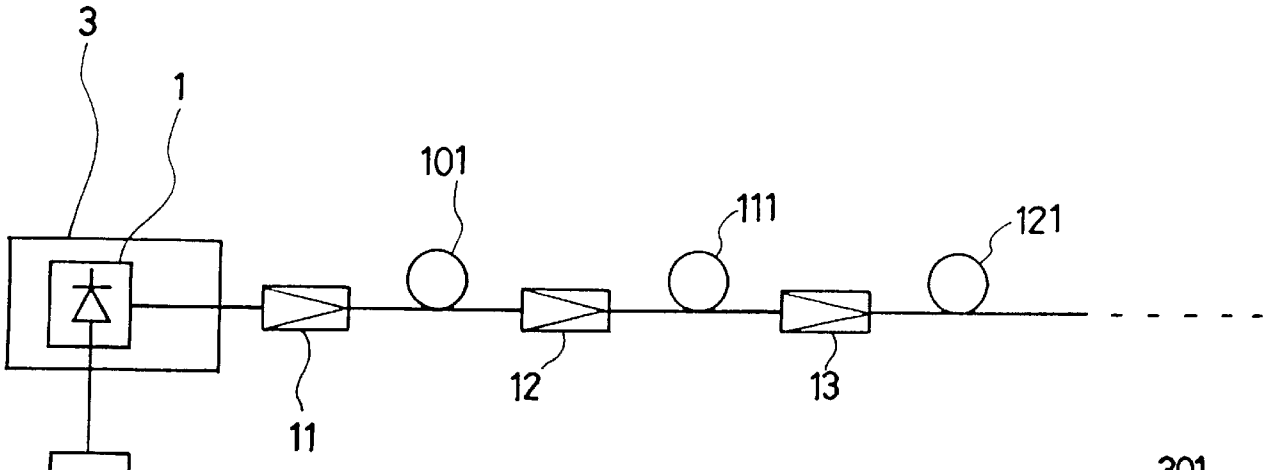
FIG. 6 is a diagrammatic view of an optical amplifier lumped repeater system of a third embodiment of the present invention.

Next, the third embodiment of FIGS. 6(A) and 6(B) will be described.

An optical transmitter 3 drives the current to be supplied to a semiconductor laser source 1 with an electric signal of 5 Gbit/s outputted from a modulation signal source 5 and outputs a CPFSK (Continuous-Phase Frequency-Shift-Keying) optical signal modulation light waveform. The CPFSK modulated optical signal is amplified to +6 dBm by a first erbium-doped optical fiber amplifier 11 and outputted to a first transmission optical fiber 101. The transmission line optical fiber 101 is an optical fiber of 100 km which has a normal dispersion (D<0) amount of −0.4 ps/km/nm and a loss of 21 dB at an oscillation wavelength of 1.552 $\mu$m of the semiconductor laser source 1. The signal transmitted through the transmission line optical fiber 101 is again amplified to +6 dBm by a second erbium-doped optical fiber amplifier 12 and outputted to a second transmission line optical fiber 111. The output light of the optical fiber 111 is amplified by a third optical amplifier repeater 13 and outputted to a third transmission line 121. In this manner, an optical amplifier lumped repeater system of 100 stages having a total distance of 10,000 km is constructed. In the optical amplifier lumped repeater system, an optical fiber of 100 km of normal (D<0) dispersion similar to optical fiber 101 is employed for transmission optical fibers 111, 121, . . .

An optical receiver 200 mixes the signal light that has passed the last optical transmission line 191 with the output of a local oscillation light source 201 having a frequency that differs from that of the semiconductor laser source 1 by 10 $GH_z$ and detects the mixture signal by heterodyne detection by a PIN photodiode 51, which is a photoelectric transducer. The heterodyne-detected signal is passed through a delay detector 300 to reproduce it as an electric signal of 5 Gbit/s. Here, a delay equalizer 301 shown in FIG. 6(B) is not used.

The dispersion of the transmission optical fibers is not limited to −0.4 ps/km/nm, and an optical fiber having a normal (D<0) or anomalous (D>0) dispersion region other than that value may be employed. It is to be noted, however, that taking the distribution of dispersion values in the longitudinal direction of the optical fibers, it is effective to set the dispersion to a value in a somewhat excessively normal (D<0) dispersion region in advance so that the zero dispersion of the optical fiber may not occur at the signal light wavelength.

Figure 7:
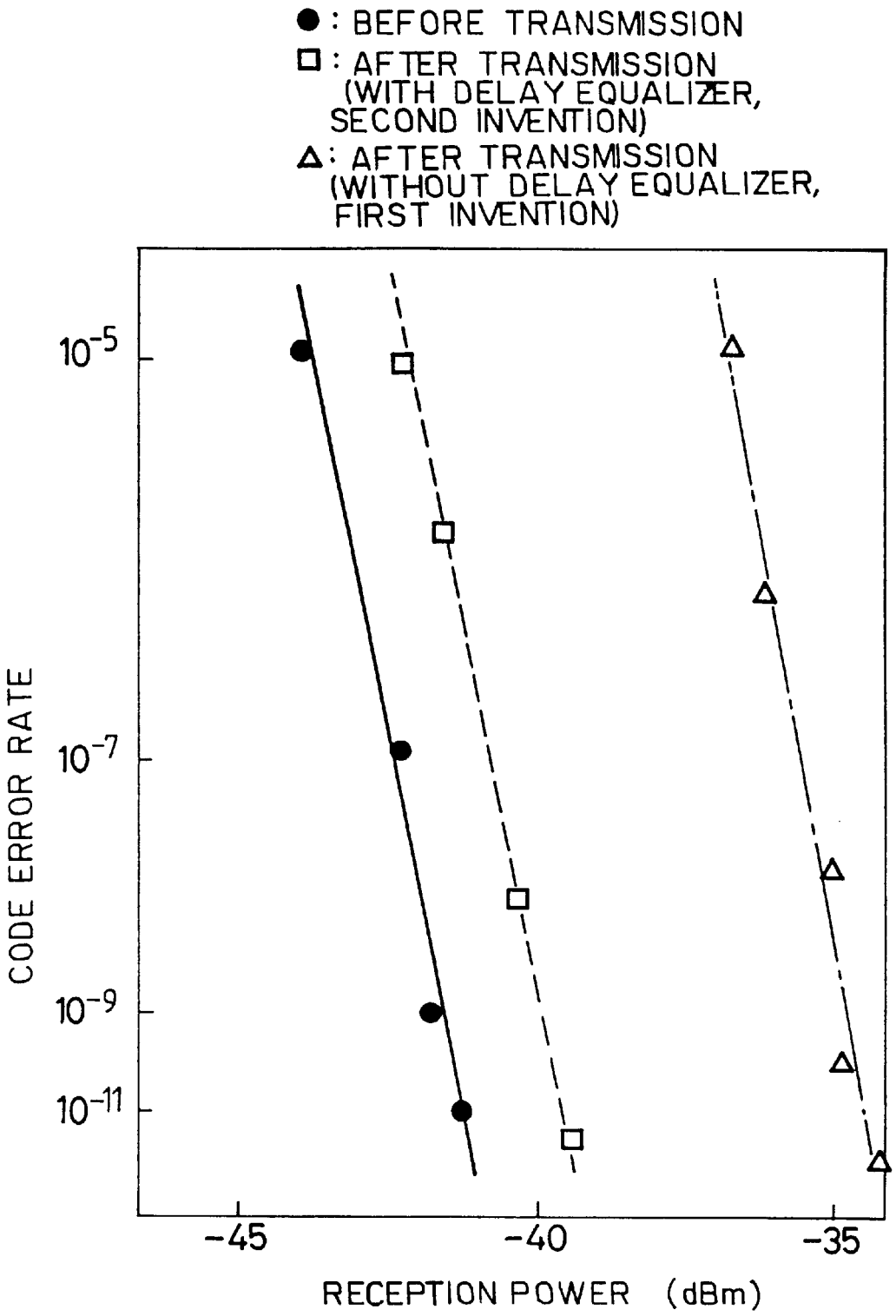
FIG. 7 is a diagram illustrating a code error ratio characteristic when the present invention is used.

According to the above-mentioned experiments by Saito et al., when transmission was performed with the signal wavelength set to coincide with the zero dispersion wavelength, an error rate floor phenomenon was observed when the transmission distance is over approximately 2,500 km. However, when a transmission optical fiber was set to a normal (D<0) dispersion region as in the present invention, the noise-increasing effect due to a non-linear effect was suppressed and no floor phenomenon was observed. However, reception sensitivity was degraded by approximately 7 to 8 dB due to the influence of the dispersion of the transmission line, as indicated by an alternate long and short dashes in FIG. 7. Further, while some influence of self-amplitude modulation peculiar to coherent communications was observed, no significant waveform degradation was found because the dispersion of the transmission optical fiber was set to a value in a normal (D<0) dispersion region and the dispersion value was low.

Figure 6B:
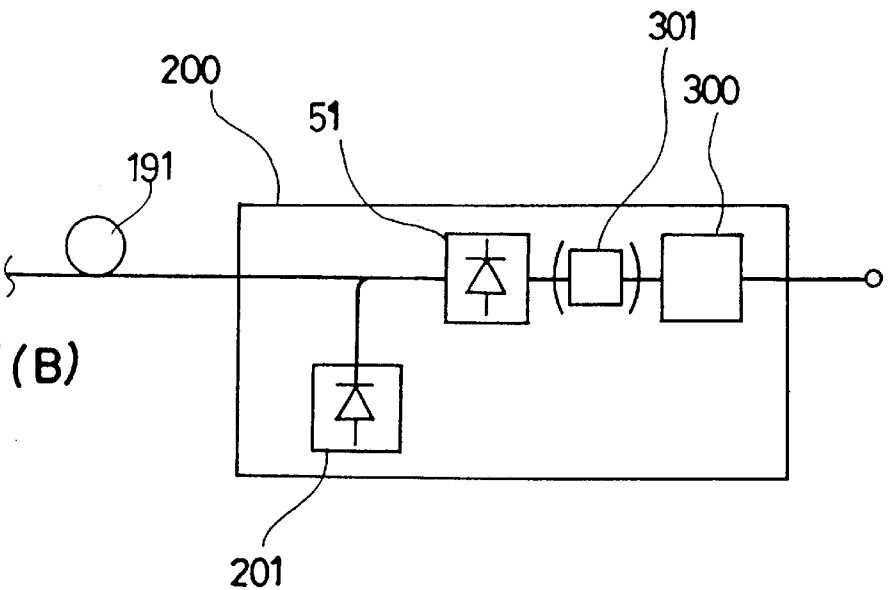

Further, it was attempted to compensate for the influence of dispersion of a transmission line upon a heterodyne-detected electric signal in an intermediate frequency band using a delay equalizer 301, as shown in FIG. 6(B). A conventional strip line circuit was used for dispersion compensation. The amount of compensation of the strip line circuit was set to 4,000 ps/nm so as to compensate for the total amount of transmission line dispersion. By detecting the electric signal by delay detection after the electric signal passed the delay equalizer, the sensitivity degradation amount was suppressed to below 3 dB, as indicated by a broken line in FIG. 7.

The present invention may be modified in numerous ways in addition to those described above. For example, it is possible to set the transmission wavelength to a value in a anomalous (D>0) dispersion wavelength band of a transmission optical fiber and employ a normal (D<0) dispersion optical fiber as the optical fiber for compensating for the anomalous (D>0) dispersion or to use a normal (D<0) dispersion optical fiber and a anomalous (D>0) dispersion optical fiber having equal absolute dispersion values and equal distances. Further, the number of kinds of optical fibers used for each section is also not limited to two but may be three or more. If the total amount of dispersion for each section is set to a value in the proximity of zero, the lengths of anomalous (D>0) and normal (D<0) dispersion optical fibers can be set freely for each section. Also, the number of repeating stages is not limited to 10 stages, but may be more or less than 10 stages, including for example 20 or 100 stages. Further, the length of each section may be greater or smaller than 100 km, including for example 50 km or 150 km, and the bit rate used may also be higher or lower than 10 Gbit/s, including for example 2.5 Gbit/s, 5 Gbit/s or 20 Gbit/s.

Further, the modulation system is not limited to intensity modulation but may also be frequency modulation or phase modulation. Also, the reception system is not limited to a direct detection system, and a heterodyne detection system may be employed. In addition, the optical amplifier for use with the optical amplifier lumped repeater system is not limited to an erbium-doped optical fiber amplifier but may be a semiconductor laser amplifier, a praseodymium-doped (Pr+3) optical fiber amplifier or an optical Raman amplifier. Also, the wavelength band of the transmission light source is not limited to the 1.5 $\mu$m band, but the 1.3 $\mu$m band may be used instead.

It is to be understood that variations and modifications of "Optical Communication Transmission System" disclosed herein will be evident to one skilled in the art. It is intended that all such modifications and variations be included within the scope of the appended claims.

What is claimed is:

1. A long-haul optical amplifier lumped repeater communication system comprising:

an optical transmitter generating a light signal;

a first optical transmission link connected to said optical transmitter and having a zero dispersion wavelength of a value different from the transmission wavelength of the optical transmitter;

a plurality of optical amplifier-repeaters, one of the optical amplifier-repeaters being connected to the first optical link;

a plurality of intermediate optical transmission links interconnecting the plurality of amplifier-repeaters, each of said plurality of optical transmission links having a zero dispersion wavelength of a value different from the transmission wavelength of the optical transmitter;

an optical receiver;

a terminating optical transmission link connected between one of the optical amplifier-repeaters and the optical receiver and having a zero dispersion wavelength of a value different from the transmission wavelength of the optical transmitter;

a plurality of dispersion compensating means, each connected to respective one of said first, intermediate and terminating optical links so that the total dispersion of the system is approximately equal to zero.

2. The long-haul optical amplifier lumped repeater communication system of claim 1, wherein said plurality of dispersion compensating means introduce chromatic dispersion so that the total dispersion of each optical transmission link and a dispersion compensating means connected thereto adds up to zero.

3. The long-haul optical amplifier lumped repeater communication system of claim 1, wherein said optical transmitter includes an optical amplifier and wherein said optical receiver includes an optical amplifier.

4. The long-haul optical amplifier lumped repeater communication system of claim 1, wherein said plurality of dispersion compensating means are included in said plurality of optical amplifier-repeaters.

*5. An optical amplifier repeater in an optical transmission line with an optical transmission link having a zero dispersion wavelength of a value different from the wavelength of a received optical signal for amplifying said received optical signal from said optical transmission link comprising:*

*a dispersion compensator connected to said optical transmission link for compensating chromatic dispersion resulted from said optical transmission link such that chromatic dispersion substantially equals zero and outputting a compensated signal;*

*an optical amplifier connected to said dispersion compensator for optically amplifying said compensated signal and outputting an amplified signal as an output optical signal of said optical amplifier repeater.*

*6. An optical amplifier repeater as claimed in claim 5, wherein said dispersion compensator comprises an optical*

*fiber having chromatic dispersion characteristics of different polarity from that of said optical transmission link.*

*7. A long-haul optical amplifier lumped repeating method for transmitting an optical signal via first to N-th optical transmission links which are connected in a cascade arrangement, each of said first to N-th transmission links having a zero dispersion wavelength of a value different from the wavelength of said optical signal, where N is an integer greater than 1, comprising the steps of:*

*(a) generating and supplying, at the transmitting side, an optical signal to said first optical link;*

*(b) repeating, (N−1) times, the following step b-1) from I=2 to I=N,*

*b-1) amplifying an optical signal supplied from said (I-1)th optical transmission link to output the amplified optical signal to said Ith optical transmission link:*

*(c) compensating chromatic dispersion included in at least one of the output optical signals from said first to (N−1)th optical transmission links; and*

*(d) supplying an optical signal from Nth optical transmission link to a destination side, wherein*

*at least one step of compensating for chromatic dispersion is inserted in said step (b), said compensating step compensating chromatic dispersion included in said optical signal supplied therein so that the total dispersion from the transmitting side to said destination side may be substantially equal to zero.*

*8. An optical communication transmission system, comprising:*

*a plurality of optical amplifiers located in a cascade arrangement on a transmission line having a zero dispersion wavelength at a wavelength different from the wavelength of a transmission light, for optically amplifying the transmission light to output an amplified transmission light; and*

*at least one dispersion compensator located between said optical amplifiers, for compensating chromatic dispersion included in said amplified transmission light such that the chromatic dispersion included in said amplified transmission light from said transmission line substantially equals zero.*

*9. An optical communication transmission system as claimed in claim 8, wherein said dispersion compensator makes the total dispersion of said system substantially equal to zero.*

*10. An optical communication transmission system as claimed in claim 8, wherein said optical amplifiers include an erbium doped optical fiber amplifier.*

*11. An optical communication transmission system as claimed in claim 8, further comprising:*

*a light generator for generating said transmission light; and*

*a dispersion shift optical fiber located between said optical amplifiers, having a zero dispersion wavelength of a value different from the wavelength of said transmission light.*

*12. An optical communication transmission system as claimed in claim 11, wherein said light generator comprises:*

*a semiconductor laser source for outputting optical power;*

*a modulator for modulating said optical power with a modulation signal having a predetermined bit rate to generate said transmission light.*

*13. An optical communication transmission system as claimed in claim 12, wherein said bit rate of said modulation signal is equal to or more than 10 GB/s.*

*14. An optical communication transmission system as claimed in claim 12, wherein said bit rate of said modulation signal is equal to or more than 5 GB/s.*

*15. An optical communication transmission system as claimed in claim 11, wherein said dispersion compensator comprises a dispersion compensation optical fiber having a zero dispersion wavelength of a value different from the wavelength of said transmission light.*

*16. An optical communication transmission system as claimed in claim 15, wherein said dispersion compensation optical fiber is inserted after said dispersion shift optical fiber between said optical amplifiers adjacently located.*

*17. An optical communication transmission system as claimed in claim 8, wherein the wavelength of said transmission light is selected to be either of a 1.3 μm band or a 1.5 μm band.*

*18. An optical communication transmission system as claimed in claim 15, wherein said dispersion compensator comprises a dispersion compensation optical fiber having dispersion characteristics of different polarity from that of said dispersion shift optical fiber.*

*19. An optical communication transmission system as claimed in claim 18, wherein said dispersion of said dispersion compensation optical fiber has a positive value and said dispersion of said dispersion shift optical fiber has a negative value.*

*20. An optical communication transmission system as claimed in claim 19, wherein an absolute value of said dispersion of said dispersion compensation optical fiber is larger than that of said dispersion of said dispersion shift optical fiber.*

*21. An optical communication transmission system as claimed in claim 15, wherein the length of said dispersion compensation optical fiber is shorter than that of said dispersion shift optical fiber.*

*22. An optical communication transmission system having a plurality of optical amplifiers located in a cascade arrangement, each of said optical amplifiers amplifying transmission light to output an amplified transmission light, comprising:*

*at least two pieces of dispersion compensation optical fiber having substantially a zero dispersion wavelength of a value different from the wavelength of said transmission light, for compensating dispersion included in said amplified transmission light;*

*at least two pieces of dispersion shift optical fiber having substantially a zero dispersion wavelength of a value different from the wavelength of said transmission light; and*

*wherein said dispersion compensation optical fiber and said dispersion shift optical fiber are alternately located with respect to one another and said plurality of optical amplifiers are connected to said interconnected dispersion shift optical fiber and dispersion compensation optical fiber;*

*whereby the dispersion in the amplified transmission light substantially equals zero.*

*23. An optical transmission signal transmitted on a transmission line having substantially a zero dispersion wavelength of a value different from the wavelength of said optical transmission signal, wherein said optical transmission signal is optically amplified into a first amplified optical transmission signal, dispersion included in said first amplified optical transmission signal is compensated such that the dispersion substantially equals zero, and said dispersion compensated first amplified optical transmission signal is optically amplified into a second amplified optical transmission signal.*

*24. An optical transmission signal as claimed in claim 23, wherein said optical transmission signal is output from a semiconductor laser source.*

*25. An optical communication transmission system, comprising:*

*a plurality of optical amplifiers located on a transmission line constructed of a dispersion shift optical fiber having a zero dispersion wavelength of a value different from the wavelength of transmission light, for amplifying said transmission light; and*

*a plurality of dispersion compensators located on said transmission line at a predetermined interval, for compensating dispersion included in said transmission light such that dispersion substantially equals zero.*

*26. An optical communication transmission system as claimed in claim 25, wherein said dispersion compensator comprises a dispersion compensation optical fiber having substantially a zero dispersion wavelength of a value different from the wavelength of said transmission light.*

*27. An optical communication transmission system as claimed in claim 25, wherein a wavelength of said transmission light is within a 1.5 μm band.*

*28. An optical communication transmission method, comprising the steps of:*

*generating transmission light;*

*amplifying said transmission light by a plurality of amplifiers located in a cascade arrangement on a transmission line of dispersion shifted optical fibers having a zero dispersion wavelength of a value different from the wavelength of said transmission light to output amplified transmission light; and*

*compensating dispersion included in said amplified transmission light between said optical amplifiers such that the dispersion of said amplified transmission light output from the transmission line is substantially zero.*

*29. An optical amplifier repeater in an optical transmission line with an optical transmission link having a zero dispersion wavelength of a value different from the wavelength of a received optical signal for amplifying said received optical signal from the optical transmission link; comprising;*

*a dispersion compensator for compensating chromatic dispersion resulted from said optical transmission link such that chromatic dispersion substantially equals zero and outputting a compensated signal; and*

*an optical amplifier for optically amplifying said compensated signal and outputting an amplified signal as an output optical signal of said optical amplifier repeater.*

* * * * *